United States Patent [19]

Yoshino et al.

[11] Patent Number: 4,516,740
[45] Date of Patent: May 14, 1985

[54] TAPE DRIVING CONTROL APPARATUS

[75] Inventors: Tadashi Yoshino, Neyagawa; Masayuki Mamei, Takatsuki, both of Japan

[73] Assignee: Matsushita Electric Industrial Co., Ltd., Kadoma, Japan

[21] Appl. No.: 543,451

[22] Filed: Oct. 18, 1983

[30] Foreign Application Priority Data

Oct. 21, 1982 [JP] Japan .................. 57-185660
Mar. 23, 1983 [JP] Japan .................. 58-49234

[51] Int. Cl.³ .................. G03B 1/04; G11B 15/32
[52] U.S. Cl. .................. 242/203; 318/317; 360/73
[58] Field of Search .......... 242/67.5, 200-204, 242/186, 187, 182; 318/6, 7, 317, 400-404; 360/71, 73, 74.1-74.3

[56] References Cited

U.S. PATENT DOCUMENTS

| | | | |
|---|---|---|---|
| 3,761,035 | 8/1969 | Wang | 242/182 |
| 4,051,415 | 9/1977 | Martin | 318/7 |
| 4,078,193 | 3/1978 | Anderson et al. | 318/317 |
| 4,157,488 | 6/1979 | Allan | 318/7 |
| 4,347,538 | 8/1982 | Klank | 360/137 |
| 4,407,463 | 10/1983 | Ashida | 242/201 |

FOREIGN PATENT DOCUMENTS

| | | |
|---|---|---|
| 356917 | 6/1980 | Austria . |
| 361233 | 2/1981 | Austria . |
| 2713588 | 11/1977 | Fed. Rep. of Germany . |
| 3213745 | 11/1982 | Fed. Rep. of Germany . |
| 2082373 | 3/1982 | United Kingdom . |
| 2101361 | 1/1983 | United Kingdom . |

Primary Examiner—Leonard D. Christian
Attorney, Agent, or Firm—Wenderoth, Lind & Ponack

[57] ABSTRACT

A tape driving control apparatus is arranged such that the leading end portion and its vicinity or the trailing end portion and its vicinity of the magnetic tape is detected when the magnetic tape is wound at a high speed around the reel on the winding side from the reel on the feed side by a pair of reel motors, and the tape speed is made lower in the leading end portion and its vicinity or in the trailing end portion and its vicinity, and is made higher in the tape central portion so as to thereby shorten the winding time and to reduce noises due to the reel rotation.

4 Claims, 10 Drawing Figures

TAPE DRIVING CONTROL APPARATUS

BACKGROUND OF THE INVENTION

1. Field of the Invention

The present invention relates to a tape driving control apparatus for use in a video tape recorder or the like.

2. Description of Prior Art

Referring to FIG. 1, there is shown a schematic construction diagram of a tape driving control apparatus for use in the FF (fast forward) condition of the conventional cassette type of video tape recorder (hereinafter referred to as VTR). In FIG. 1, a tape cassette 1 accommodates a magnetic tape 2 which is wound around reels 5 and 6. In the VTR, reel shafts 3 and 4 on the feed side and the winding side are adapted to be engaged with the reels 5 and 6 on the feed side and the winding side of the tape cassette 1. Also, reel motors 7 and 8 are provided to drive directly the reel shafts 3 and 4 on the feed side and the winding side. In the FF (fast forward) position, the magnetic tape 2 is wound around the reel 6 on the winding side from the reel 5 on the feed side. Frequency generators (hereinafter referred to as FG) 9 and 10 are also provided to detect the rotational speed of the reel motors 7 and 8 on the feed side and the winding side. The output signals of the FIGS. 9 and 10 are inputted into frequency-voltage converting circuits 11 and 12 on the feed side and the winding side, wherein the frequencies are converted into voltages. The voltage outputs of the frequency-voltage converting circuits 11 and 12 are added at the ratio of 1:1 in a mixing circuit 13. The output of the mixing circuit 13 is inputted into a speed comparing circuit 14 on the winding side for comparison with the reference voltage from a speed-setting reference voltage circuit 15. Then, the output of the speed comparing circuit 14 on the winding side is inputted into a reel motor driving circuit 16 on the winding side to control the speed of the reel motor 8 on the winding side. The magnetic tape 2 of the reel 5 on the feed side is wound, around the reel 6 on the winding side, at an approximately constant tape speed. On the other side, an instruction voltage from a back tension torque producing circuit 17 on the feed side is inputted into a reel motor driving circuit 18 on the feed side to cause a given motor current to flow to the reel motor 7 on the feed side so as to produce the torque in the direction of an arrow 19 so that proper back tension may be produced in the magnetic tape 2.

According to the above described conventional example, the tape speed of the magnetic tape 2 is slowest at the leading end and the trailing end of the magnetic tape and is fastest at the central portion of the magnetic tape 2 both in the FF (fast forward) position and the REW (reverse winding) position. The difference between them is so small that the tape speed is considered almost constant. However, one makes the tape speed fast so as to shorten the respective time of the FF (fast forward) and the REW (reverse winding), an extremely large force is applied upon the trailing end of the magnetic tape, thus resulting in the tape being broken due to the fast speed of the tape in the trailing end portion thereof. Accordingly, in the conventional apparatus, there was a limit to the fast tape speed, and there was a problem in that the respective time of the FF (fast forward), and the REW (reverse winding) could not be shortened. Also, since the magnetic tape speed of the FF (fast forward) is almost constant, the rotational speed of the reel motor 8 on the winding side in the tape leading end portion becomes extremely fast, thus resulting in noises from the reel motor on the winding side. Particularly, when a reel stand on the winding side is driven by the reel motor on the winding side through a reduction mechanism, such as gears, the noises produced by the reduction mechanism are a problem.

Furthermore, in the FF (fast forward) position, a constant current flows to the reel motor 7 on the feed side to produce torque in the direction of an arrow 19. The produced torque Ts of the reel motor 7 on the feed side is as follows:

$$Ts = Krs \times Is \qquad (1)$$

wherein Krs: the torque production constant of the reel motor on the feed side. The tape tension $T_A$ of the exit from the reel 5 on the feed side is as follows:

$$Ts = T_A \times Rs \qquad (2)$$

wherein Rs: the radius of the tape wound around the reel 5 on the feed side. Since the produced torque Ts of the reel motor 7 on the feed side is constant, the tape tension $T_A$ of the exit from the reel 5 on the feed side increases in an inverse proportion to the decrease of the radius Rs of the magnetic tape 2 wound around the reel 5 on the feed side. As it passes each post, the tape tension increases as $e^{\mu\theta}$ ($\mu$ is a tape friction coefficient, $\theta$ is a tape winding angle), and the tape tension $T_B$ of the entrance of the reel 6 on the winding side becomes extremely large, and the load of the reel motor 8 on the winding side increases. The speed of the magnetic tape 2 must be slow or the winding operation cannot be effected in the worst case. Also, as the tension changes by the tape winding diameter ratio of the reel 5 on the feed side at the winding leading-end and the winding trailing-end, the tape tension changes by as much as approximately three times and the tape running condition becomes worse.

SUMMARY OF THE INVENTION

An object of the present invention is to provide a tape driving control apparatus for use in a VTR, which can remove such conventional disadvantages as described hereinabove, wherein a high-speed winding operation is performed without the application of a high tape tension upon the magnetic tape, and the rotational speed of the reel motor on the winding side is restricted to reduce noises caused by the reel motor.

Another object of the present invention is to provide a tape driving control apparatus for use in a VTR, wherein the leading end portion and its vicinity or the trailing end portion and its vicinity of the magnetic tape is detected when the magnetic tape is wound (during the fast forward and the reverse winding of the tape) at a high speed around the reel on the winding side from the reel on the feed side by a pair of reel motors, and the tape speed is made lower in the leading end portion and its vicinity or in the trailing end portion and its vicinity, and is made higher in the tape central portion, whereby the winding time is shorter and noises produced through the rotational drive of the reel at a high speed are reduced.

According to the present invention, there is provided a tape driving control apparatus comprising a feed reel stand, a winding reel stand, rotational speed information detecting means for detecting the rotational speed information in accordance with the respective revolution numbers of the feed reel stand and the winding reel stand, a mixing circuit for adding, as voltages, the rotational speed information of both of said rotational speed information detecting means, a means for comparing the outputs of the mixing means with reference signals, a controlling means for controlling the rotational speed of a winding reel motor driving said winding reel stand in accordance with the comparison output, a tape-winding-diameter detecting means for detecting that at least the tape-winding-diameter of said winding reel is a given diameter or less with the use of the rotational speed information from both of said rotational speed information detecting means, and a speed varying means for varying either the output of said mixing circuit or the reference signal by the output of the tape-wind-diameter detecting means.

These and other objects, features, aspect and advantages of the present invention will become more apparent from the following detailed description of the present invention when taken in conjunction with the accompanying drawings.

DESCRIPTION OF THE PREFERRED EMBODIMENTS

Figure 1:
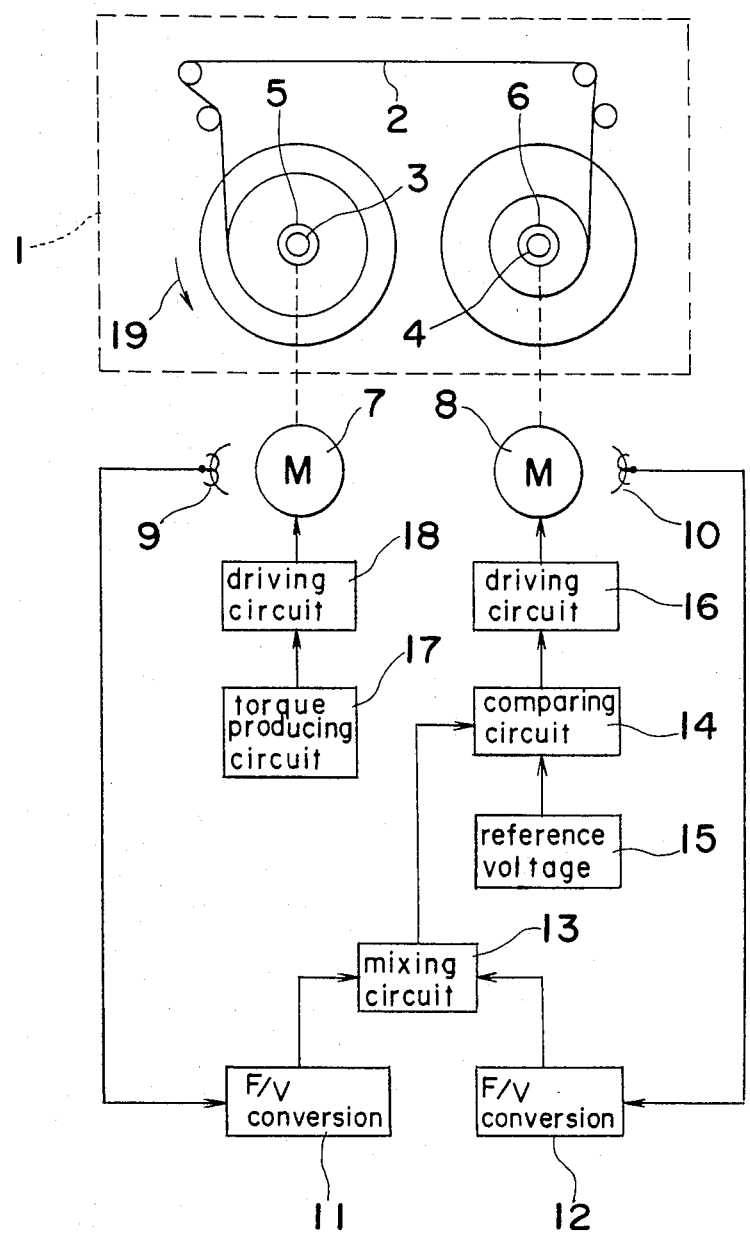
FIG. 1 is a block diagram of a tape driving control apparatus for the conventional cassette type of VTR, as referred to above.

Before the description of the present invention proceeds, it is to be noted that like parts are designated by like reference numerals throughout several views of the accompanying drawings.

According to the present invention, at least one of the leading end and the trailing end of the magnetic tape is in the FF (fast forward) position and the REW (reverse winding) position to delay the tape speed, and to make the magnetic tape speed fast during winding of the central portion of the magnetic tape, and the respective time of the FF (fast forward) and the REW (reverse winding) can be considerably shortened while the noises caused by the reel motor are being controlled.

Figure 2:
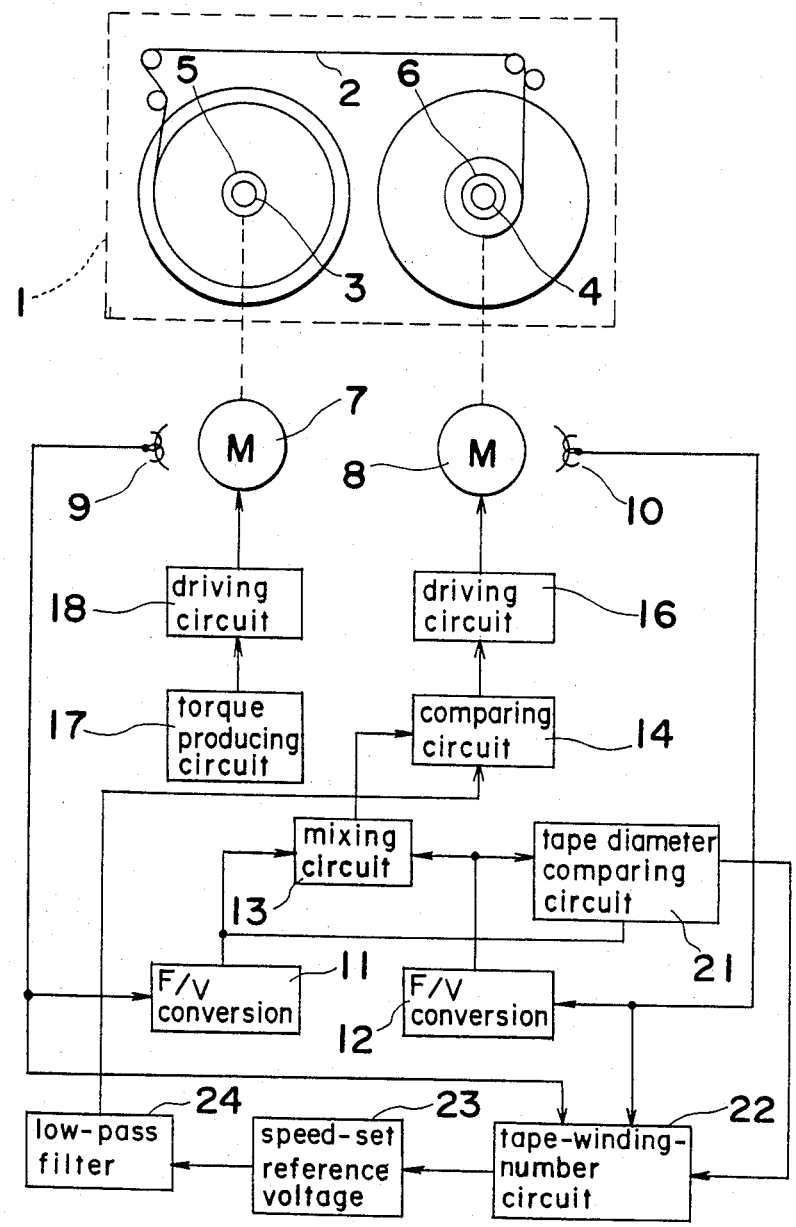
FIG. 2 is a block diagram of the tape driving control apparatus for a cassette type of VTR in a first embodiment of the present invention.

A first embodiment of the present invention will be described with reference to FIG. 2, which shows a schematic construction diagram of a tape driving control apparatus in the FF (fast forward) mode of a cassette type of VTR according to the present invention. Referring to FIG. 2, a tape cassette 1 comprises a magnetic tape 2 accommodated therein and wound around a pair of reels 5 and 6. In the tape driving apparatus of VTR, there is provided a pair of reel shafts 3 and 4 which are respectively on the feed side and on the winding side and which are respectively used as a feed reel stand and a winding reel stand; the shafts are both engaged with the reels 5 and 6 on the feed side and on the winding side of the tape cassette 1, respectively. Also, a pair of reel motors 7 and 8 are provided to directly drive the reel shafts 3 and 4 on the feed side and the winding side. In the FF (fast forward) position, the magnetic tape 2 is wound around the reel 6 on the winding side from the reel 5 on the feed side. Frequency generators 9 and 10 are also provided to detect the rotational speed of the reel motors 7 and 8 on the feed side and on the winding side. The output signals of the frequency generators 9 and 10 are inputted into frequency-voltage converting circuits 11 and 12 on the feed side and on the winding side, wherein their frequencies are converted into voltages. The voltage outputs of the frequency/voltage converting circuits 11 and 12 are added in voltage at a ratio of 1:1 in a mixing circuit 13. Then, the output of the mixing circuit 13 is inputted into a speed comparing circuit 14 on the winding side. On the other hand, the outputs of the frequency-voltage converting circuits 11 and 12 are inputted into the tape diameter comparing circuit 21 where they are compared with each other in magnitude. The diameters of the tapes wound around the tape reels on the feed side and the winding side are distinguished in size to decide whether the present position of the tape is in the first half or in the latter half of the entire tape amount:

$$S = \pi \times R_1 \times N_S = \pi \times R_T \times N_T \tag{3}$$

$$R_S/R_T = N_T/N_S \tag{4}$$

wherein

S (cm/s): magnetic tape speed, $R_S$ (cm): diameter of the tape wound around the reel on the feed side, $R_T$ (cm): diameter of the tape wound around the reel on the winding side, $N_S$ (rps): rpm of the reel motor on the feed side.

$N_T$ (rps): rpm of the reel motor on the winding side.

The produced frequency of the frequency generator on the feed side $f_S$ (Hz) is:

$$f_S = Z \times N_S \tag{5}$$

and on the winding side $f_T$ (Hz) is:

$$f_T = Z \times N_T \tag{6}$$

wherein the number of the teeth of the frequency generators on the feed side and on the winding side, $Z_S = Z_T = Z$ are established. Therefore, $$R_S/R_T = f_T/f_S \tag{7}$$

Figure 3:
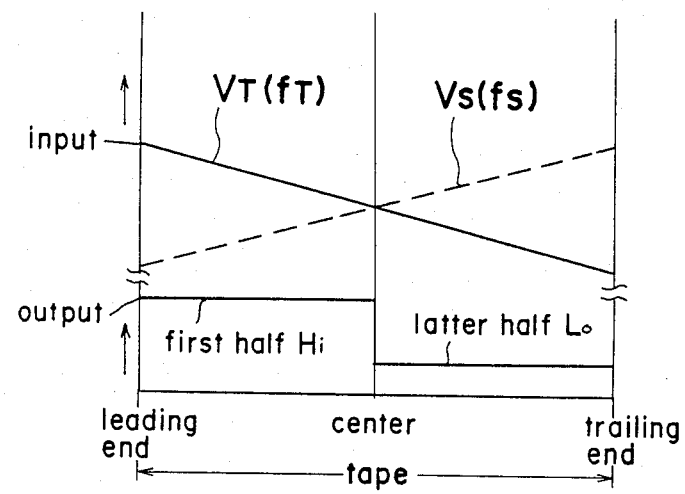
FIG. 3 is an input/output characteristics chart of a tape diameter comparing circuit in FIG. 2.

Accordingly, it is possible to distinguish whether the position of the present tape is in the first half of the entire tape or in the latter half thereof through the comparison between the generated frequencies of the frequency generators. FIG. 3 shows the input/output characteristics during the FF (fast forward) of the tape-diameter comparing circuit 21. In the first half of the magnetic tape, the amount of tape on the reel on the feed side is more than the tape amount of the reel on the winding side. As the rotational speed of the reel motors becomes faster on the winding side, the produced frequencies of the frequency generators become higher on the winding side. Therefore, the inequality $f_T > f_S$ is established. Even in the outputs of the frequency-voltage converting circuits 11 and 12, the inequality $V_T > V_S$ is established wherein Vs is the output on the feed side and $V_T$ is the output on the winding side. Thus, the output of the tape diameter comparing circuit 21 becomes High to signify that the present position of the tape is in the first half of the entire tape. In the latter half of the magnetic tape, the condition becomes reversed from that of the first half. The output of the tape diameter comparing circuit 21 becomes Low to signify that the present position of the tape is in the latter half of the entire tape.

Figure 4:
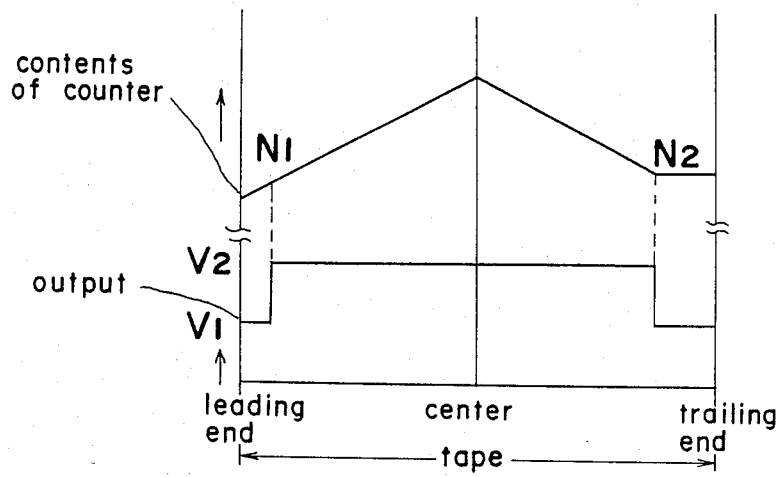
FIG. 4 is an input/output characteristics chart of a tape winding-number detecting circuit in FIG. 2.

Then, the outputs of the frequency generators 9 and 10 and the output of the tape diameter comparing circuit 21 are inputted into a circuit 22 for detecting the number of the tape windings. FIG. 4 shows the input, output characteristics of the tape-winding-number detecting circuit 22. The tape-winding-number detecting circuit 22 is composed of up/down counters. The counter is reset in modes except for the FF (fast forward) and REW (reverse winding) modes. In the first half of the FF (fast forward), the output signals ($f_S$) of the frequency generator 9 on the feed side are counted up as clock signals. Although the output is reversed from $V_1$ to $V_2$ after the first particular value ($N_1$) has been passed, the count-up operation continues. The count-down operation is performed from the contents of the counter wherein the output signals of the frequency generator 10 on the winding side were counted up at the first half as the clock signals from a time point when the tape central point has been past. After the second particular value ($N_2$) has been passed, the output is reversed again from $V_2$ to $V_1$ to prohibit feeding the clock signals to the counter. The output of the tape-winding-number detecting circuit 22 is inputted into a speed-setting reference voltage circuit 23 to produce two types of speedset voltages corresponding to the outputs $v_1$ and $V_2$ of the tape-winding-number detecting circuit 22. The tape leading end portion and trailing end portion produce low voltages, while the tape central portion produces the high voltage. The output of the speed-set reference voltage circuit 23 is inputted into a speed comparing circuit 14 on the winding side through a low-pass filter 24 to compare with the output of the mixing circuit 13. The output of the speed comparing circuit 14 is inputted into the reel motor driving circuit 16 on the winding side. The reel motor 8 on the winding side is controlled in speed during the FF (fast forward) mode, while small torque is applied, in a counter-clockwise direction, upon the reel motor 7 on the feed side so that proper back tension may be applied to the magnetic tape 2.

According to the present embodiment, the diameters of the tape wound around the tape reels on the feed side and on the winding side are distinguished in size through the comparison, in the outputs of the rotational speed information detecting means, between the reel stand on the feed side and the reel stand on the winding side so as to thereby detect whether the magnetic tape is in the first half or in the latter half. In the first half of the magnetic tape, the counting-up operation is performed by the use of an up/down counter for the number of the windings wound on the table reels on the feed side (or on the winding side) to measure it. In the latter half, the number of the windings wound around the table reel on the winding side (or on the feed side) is counted down with the use of the up/down counter. During the time from a first particular value ($N_1$) at the count-up time to a second particular value ($N_2$) at the count-down time, the speed-set reference voltage of the speed controlling circuit, which controls the rotational speed of the reel motor for driving the reel stand on the winding side, is switched so that the rotational speed may become higher. The low-pass filter 24 is inserted so that the speed-set reference voltage may not make abrupt changes. The failures of the tape can be reduced through prevention of the tape tension from being abruptly changed, and the time required for the FF (fast forward) and the REW (reverse winding) can be considerably reduced.

Figure 5:
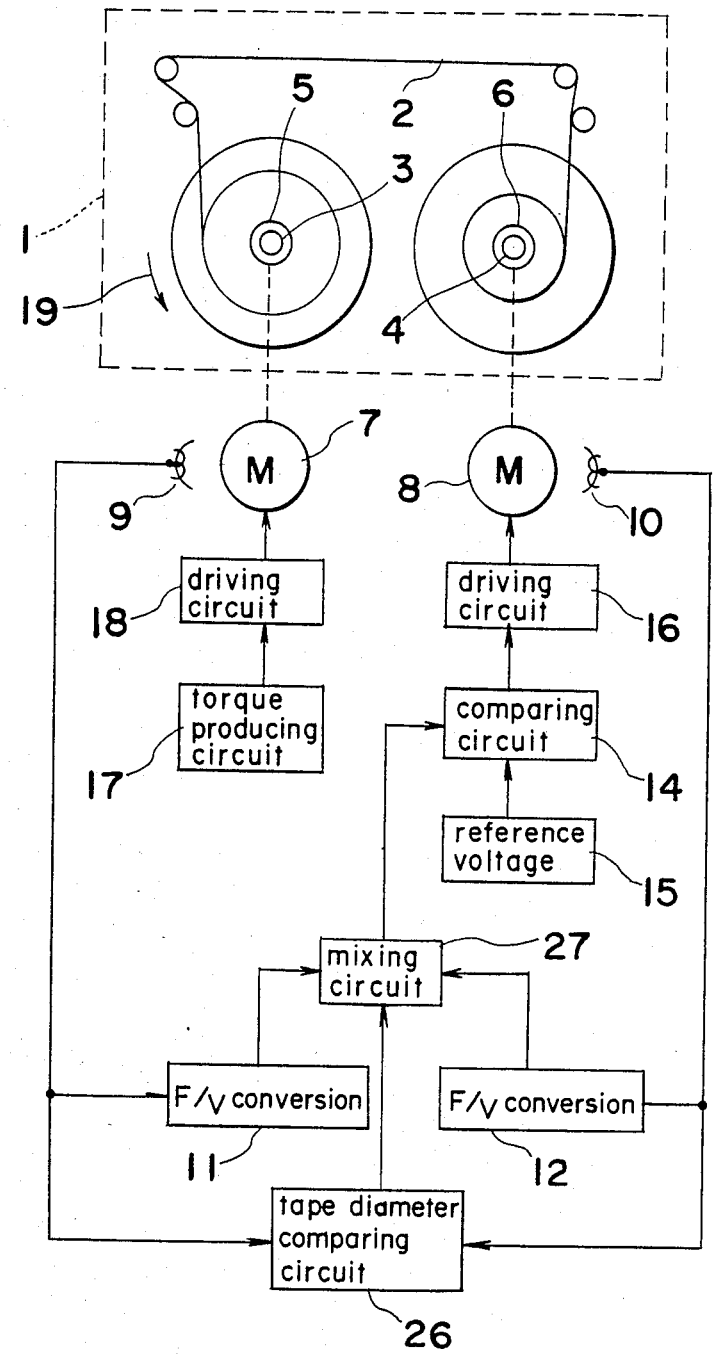
FIG. 5 is a block diagram of a tape driving control apparatus for the cassette type of VTR in a second embodiment of the present invention.
Figure 6:
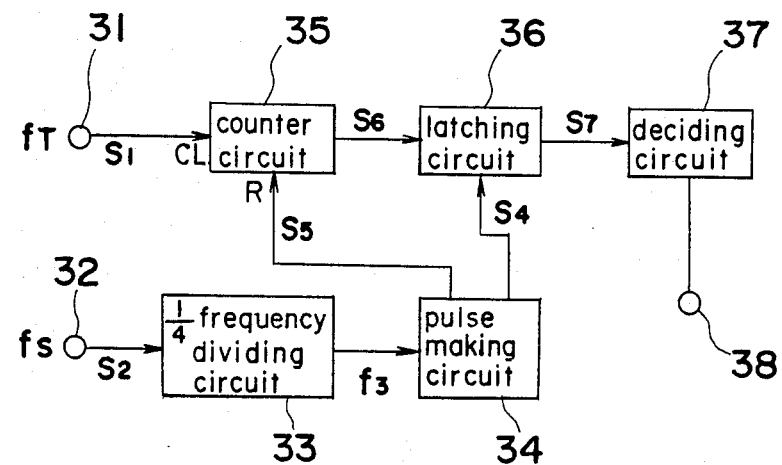
FIG. 6 is a block diagram of a tape diameter comparing circuit in FIG. 5.
Figure 7:
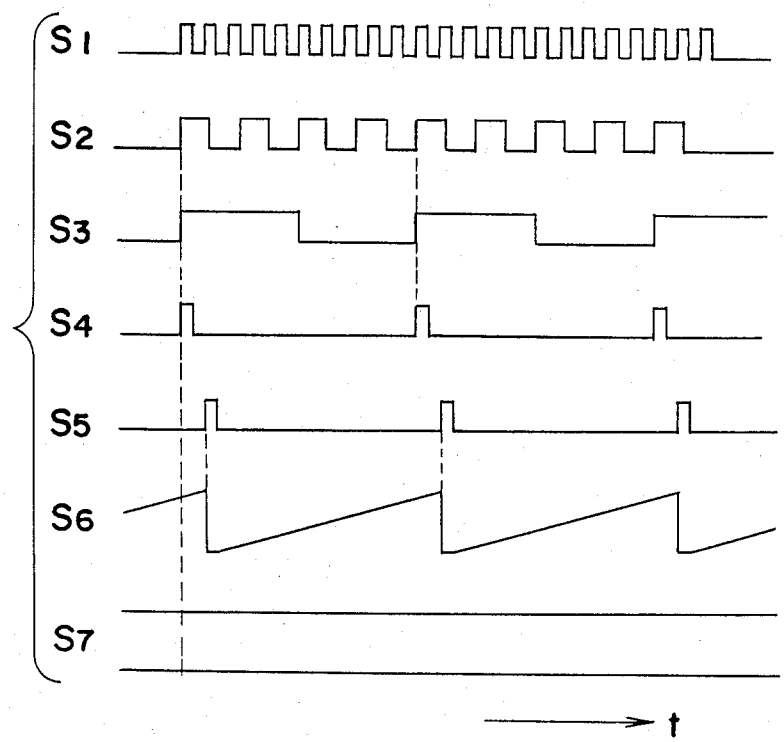
FIG. 7 shows operational waveforms at each point in FIG. 6.
Figure 8:
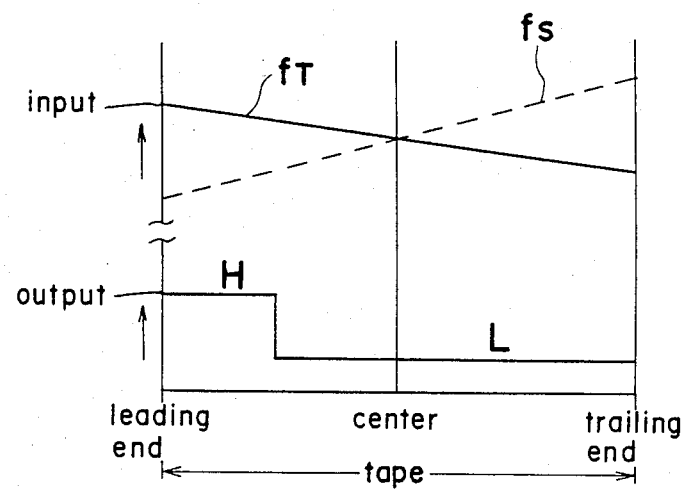
FIG. 8 is an input/output characteristics chart in FIG. 6.
Figure 9:
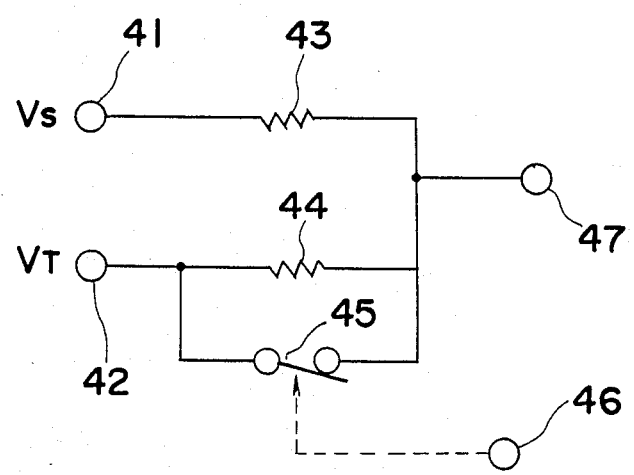
FIG. 9 is an electric circuit diagram showing one embodiment of a mixing circuit in FIG. 5.
Figure 10:
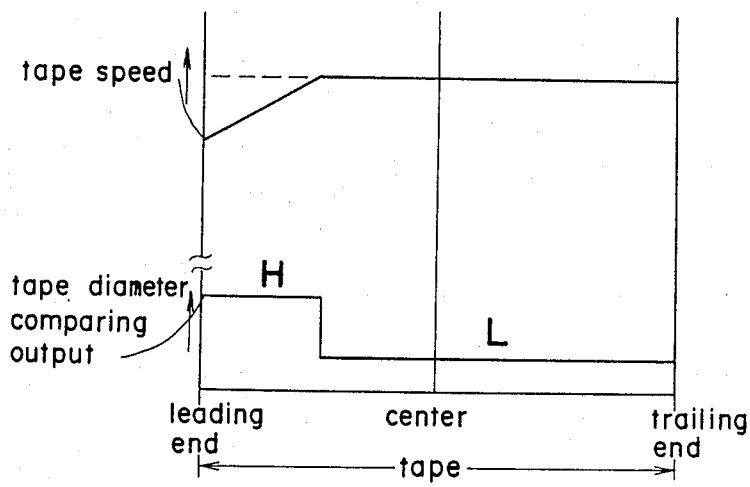
FIG. 10 is a chart showing the magnetic tape speed in a second embodiment of the tape driving control apparatus of the present invention.

Next, the second embodiment of the present invention will be described hereinafter with reference to FIG. 5 showing a schematic construction diagram of a tape driving control apparatus in the FF (fast forward) position of a cassette tape VTR according to the present invention. Referring to FIG. 5, a tape cassette 1 comprises a magnetic tape 2 and a pair of reels, the tape being wound around the reels. In the tape driving apparatus of VTR, there is provided a pair of reel shafts 3 and 4 which are respectively used as a feed reel stand and a winding reel stand, and which are respectively on the feed side and on the winding side so as to be engaged with the reels 5 and 6 on the feed side and on the winding side of the tape cassette 1, respectively. Also, there is provided a pair of reel motors 7 and 8 which are on the feed side and which are on the winding side; the motors 7 and 8 are adapted to directly drive the reel shafts 3 and 4 on the feed side and on the winding side of the tape cassette 1. In the FF (fast forward) position, the magnetic tape 2 is wound around the reel 6 on the winding side from the reel 5 on the feed side. Frequency generators 9 and 10 are provided to detect the rotational speed information of the reel motors 7 and 8 on the feed side and on the winding side. The output signals of the frequency generators 9 and 10 are inputted into frequency-voltage converting circuits 11 and 12 on the feed side and on the winding side, wherein their frequencies are converted into the voltages. On the other hand, the output signals of the frequency generators 9 and 10 are inputted into a tape diameter comparing circuit 26. The diameters of the tapes wound around the reels on the feed side and the winding side are compared with each other to detect the position of the entire tape. FIG. 6 shows a block diagram of one embodiment of the tape diameter comparing circuit 26. FIG. 7 shows the wave forms of each portion in FIG. 5, and FIG. 8 shows the input, output characteristics of a tape diameter comparing circuit. In FIG. 6, the output signals $S_1$ ($f_T$) of the frequency generator on the winding side are inputted into the input terminal 31 and are inputted into the clock input terminal of the counter circuit 35. Also, the frequency generator output signal $S_2$ ($f_S$) on the feed side is inputted into an input terminal 32 and is supplied to a one fourth frequency dividing circuit 33. Then, the output signal $S_3$ of the one fourth frequency dividing circuit 33 is inputted into a pulse making curcuit 34 to form the latch pulse signal $S_4$ and the reset pulse signal $S_5$, which is somewhat delayed as compared with the latch pulse signal $S_4$. The reset pulse signal $S_5$ is inputted into the reset terminal of the counter circuit 35. The contents of the counter of the counter circuit 35 are displayed in an analog form so that the signal $S_6$ is provided, are inputted into a latching circuit 36 and are latched with the latch pulse signal $S_4$. The output signal $S_7$ of the latching circuit 36, which is in analog form, turns the output of a deciding circuit 37 to its "High" level, in the case of the leading end portion of the entire tape, by a digital threshold value in the deciding circuit 37 and turns the output to the "Low" level in all the other cases so as to thereby provide an output from the output terminal 38. The outputs of the frequency-voltage converting circuits 11 and 12 on the feed side and on the winding side and the output of the tape diameter comparing circuit 26 are inputted into the mixing circuit 27. One embodiment of the mixing circuit 27 is shown in FIG. 9. In FIG. 9, the output ($V_S$) of the frequency-voltage converting circuit 11 on the feed side is supplied to the input terminal 41, which is connected to the output terminal 47 through a resistor 43. The output ($V_T$) of the frequency-voltage converting circuit 12 on the winding side is supplied to the input terminal 42, which is connected to the output terminal 47 through a resistor 44 and a switch 45 in parallel. The output of the tape diameter comparing circuit 26 is supplied to the input terminal 46. When the output of the tape diameter comparing circuit 26 is at a "High" level (the leading-end portion of the tape), the switch 45 is closed, and the output ($V_T$) of the frequency-voltage converting circuit on the winding side is supplied as is to the output terminal 47. When the output of the tape diameter comparing circuit 26 is at a "Low" level, the switch 5 is open, and the average voltage ($\frac{1}{2}V_S + \frac{1}{2}V_T$) of the ouputs of the frequency-voltage converting circuits 11 and 12 on the feed side and on the winding side is outputted (assuming that resistors 43 and 44 are equal in value) to the output terminal 47. The output of the mixing circuit 27 is inputted to the speed comparing circuit 14 on the winding side for comparison with a reference voltage from the speed-set reference voltage circuit 15. Then, the output of the speed comparing circuit 14 on the winding side is inputted to the reel motor driving circuit on the winding side, and the speed of the reel motor 8 on the winding side is controlled. As shown in FIG. 10, during a period (tape leading end portion) when the output of the tape diameter comparing circuit 26 is at a "High" level, the tape speed becomes faster, as the diameter of the magnetic tape to be wound around the reel on the winding side increases through the control, at a constant rate, of the rotational speed of the reel motor on the winding side. During a period when the output of the tape diameter comparing circuit 26 is at a "Low" level, the magnetic tape 2 of the reel 5 on the feed side is wound around the reel 6 on the winding side at an approximately constant tape speed. On the other hand, the instruction voltage from the back tension torque producing circuit 17 on the feed side is inputted to the reel motor driving circuit 18 on the feed side. A given motor current flows to the reel motor 7 on the feed side to cause the torque in the direction of an arrow 19 so that proper back tension occurs in the magnetic tape 2.

According to the present invention, in the embodiments described hereinabove, the leading end portion or the trailing end portion of the tape and the middle portion of the tape are distinguished in the FF (fast forward) position and the REW (reverse winding) position such that the speed of the tape leading end portion or the trailing end portion may be lowered and the speed of the tape central portion may be made higher, and the respective time required for the FF (fast forward) and the REW (reverse winding) can be considerably shortened while noises caused by the reel motor on the winding side are made smaller.

Although the present invention has fully been described in connection with the preferred embodiments thereof with reference to the accompanying drawings, it is to be noted that various changes and modifications are apparent to those skilled in the art. Such changes and modifications are to be understood as included within the scope of this invention unless they depart therefrom.

What is claimed is:

1. A tape driving control apparatus comprising a feed reel stand, a winding reel stand, a rotational speed information detecting means for detecting the rotational speed information in accordance with the respective rotational speed of the feed reel stand and the winding reel stand, a mixing circuit for adding, as voltages, the rotational speed information from both of said rotational speed information detecting means, a means for comparing the outputs of the mixing means with reference signals, a controlling means for controlling the rotational speed of a winding reel motor driving said winding reel stand in accordance with the comparison output, a tape-winding-diameter detecting means for detecting that at least the tape-winding-diameter of said winding reel is a given diameter or less with the use of the rotational speed information from both of said rotational speed information detecting means, and a speed varying means for varying either the output of said mixing circuit or the reference signal by the output of the tape-winding-diameter detecting means.

2. A tape driving control apparatus in accordance with claim 1, further comprising a tape comparing means, which compares the rotational speed information from both of said rotational speed information detecting means to generate the inversion output when said rotational speed information are equal, and an up/down counter, which count up the output of said tape diameter comparing means before the inversion with the output of the rotational speed information detecting means on either the feed side as the input of the up/down counter, and counts down the output of said tape diameter comparing means after the inversion with the output of the rotational speed information detecting means on either the winding side as the input of the up/down counter, the tape-winding-diameter detecting means being adapted to switch the reference signal value so that the rotational speed of the reel motor on the winding side for driving the reel stand on the winding side may be increased in the periods of a first specific value ($N_1$) during the count-up operation and in the periods of a second specific vaule ($N_2$) during the count-down operation.

3. A tape driving control apparatus in accordance with claim 1, further comprising a low-pass filter connected between said means for comparing and said controlling means, said filter arranged so that said reference signal for controlling the rotational speed of the reel motor on the winding side used for driving a reel stand on the winding side is varied gradually.

4. A tape driving control apparatus in accordance with claim 1, wherein said tape-winding-diameter detecting means is composed of a detecting means for comparing the rotational speed information of both of said rotational speed information detecting means so as to produce an output when the difference therebetween is more than a predetermined value, and switches the mixing ratio of both the signals in said mixing circuit due to the output of the detecting means.

* * * * *